US009043534B2

(12) United States Patent
Schroeter et al.

(10) Patent No.: US 9,043,534 B2
(45) Date of Patent: May 26, 2015

(54) MOBILE DATA MEMORY WITH AUTOMATIC DELETE FUNCTION

(75) Inventors: Klaus Schroeter, Berlin (DE); Ho B. Chang, Horw (CH)

(73) Assignee: ASMAG-Holding GmbH, Gruenau im Almtal (AT)

( * ) Notice: Subject to any disclaimer, the term of this patent is extended or adjusted under 35 U.S.C. 154(b) by 342 days.

(21) Appl. No.: 12/998,286

(22) PCT Filed: Oct. 7, 2009

(86) PCT No.: PCT/AT2009/000386
§ 371 (c)(1),
(2), (4) Date: Jun. 1, 2011

(87) PCT Pub. No.: WO2010/040160
PCT Pub. Date: Apr. 15, 2010

(65) Prior Publication Data
US 2011/0271053 A1 Nov. 3, 2011

(30) Foreign Application Priority Data
Oct. 7, 2008 (AT) .................. A 1568/2008

(51) Int. Cl.
*G06F 12/00* (2006.01)
*G06F 13/00* (2006.01)
(Continued)

(52) U.S. Cl.
CPC ...... *G06K 19/0723* (2013.01); *G06K 19/07345* (2013.01); *G06K 19/07762* (2013.01)

(58) Field of Classification Search
None
See application file for complete search history.

(56) References Cited

U.S. PATENT DOCUMENTS

| 4,952,913 A | 8/1990 | Pauley et al. |
| 5,764,888 A | 6/1998 | Bolan et al. |
| 6,346,886 B1 * | 2/2002 | De La Huerga ........... 340/573.1 |
| 6,888,502 B2 | 5/2005 | Beigel et al. |

(Continued)

FOREIGN PATENT DOCUMENTS

| CA | 1297175 | 3/1992 |
| DE | 198 24 643 | 11/1999 |

(Continued)

OTHER PUBLICATIONS

NTT New Release, RedTacton: An innovative Human Area Networking technology that uses the surface of the human body as a transmission path, Feb. 18, 2005, pp. 1-5, http://www.ntt.co.jp/news/news05e/0502/050218.html.*

(Continued)

*Primary Examiner* — Sean D Rossiter
(74) *Attorney, Agent, or Firm* — Collard & Roe, P.C.

(57) ABSTRACT

The invention relates to a mobile data memory (1) comprising a data memory module (2) and a holding and/or carrying device (3), wherein the data memory module (2) has a non-volatile, re-writable semiconductor memory (4) and an access controller (5) with a communications module (7), wherein furthermore the communications module (7) is connected to a communications interface (8). The holding and/or carrying device (3) has a contact detection unit (16); the data memory module (2) furthermore has an allocation monitoring module (6) which is designed to evaluate the contact detection unit (16) and which is connected to the semiconductor memory (4) and/or to the access controller (5). The invention further relates to a method for person-based saving of information in a mobile data memory, wherein a remote communications station can access information saved in the data memory via a communications interface, and wherein a loss of the allocation of the mobile data memory to a person is detected. The data memory is deleted as soon as it is removed from the holding and/or carrying device.

18 Claims, 5 Drawing Sheets

Figure 1:
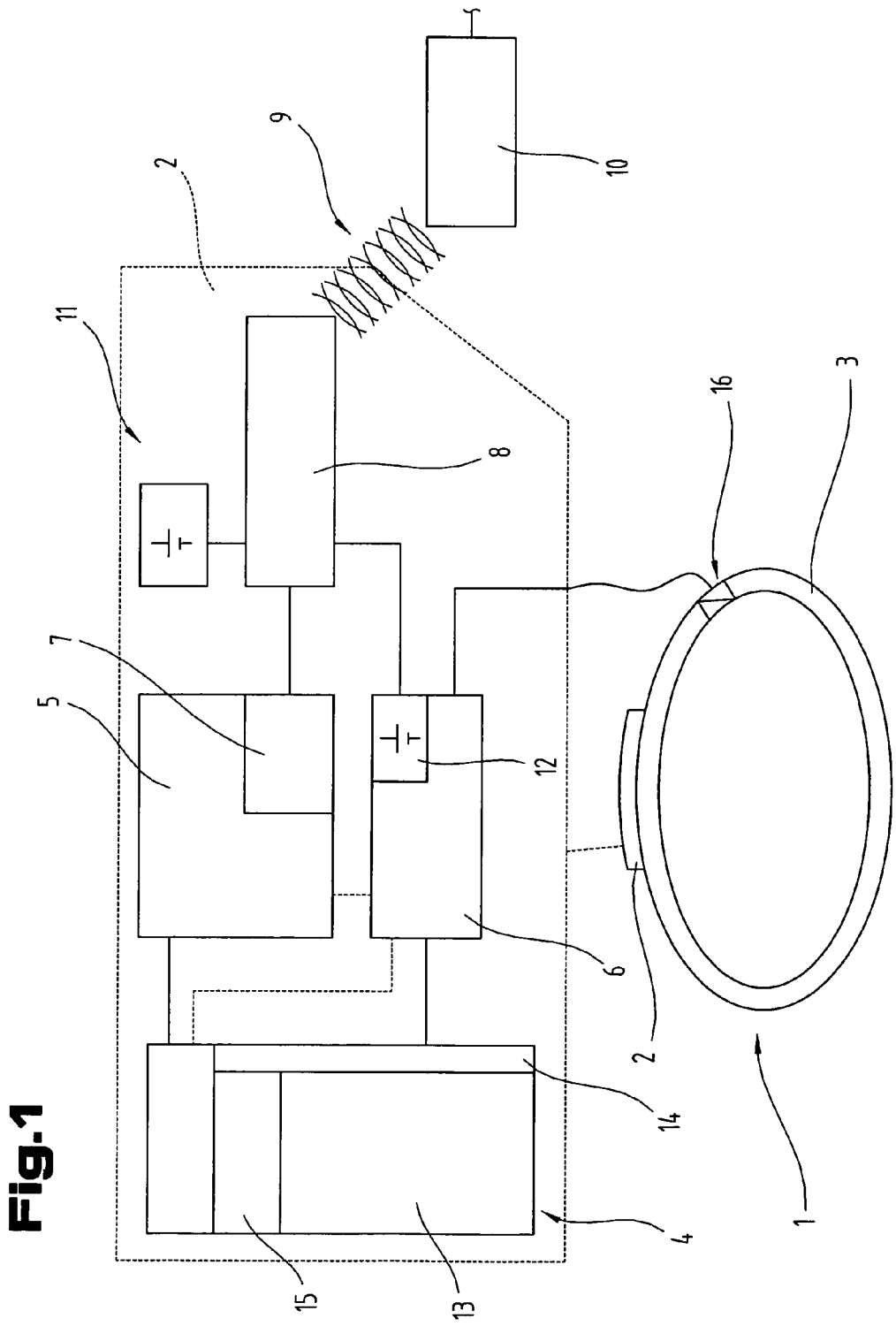

(51) Int. Cl.
*G06K 19/07* (2006.01)
*G06K 19/073* (2006.01)
*G06K 19/077* (2006.01)

(56) References Cited

U.S. PATENT DOCUMENTS

| | | |
|---|---|---|
| 8,649,201 B2 * | 2/2014 | Kato et al. .................... 365/104 |
| 2004/0256452 A1 | 12/2004 | Coughlin et al. |
| 2005/0116811 A1 | 6/2005 | Eros et al. |
| 2006/0131560 A1 * | 6/2006 | Yang et al. .................... 257/40 |
| 2008/0135900 A1 * | 6/2008 | Takiguchi et al. ............ 257/295 |
| 2008/0224127 A1 * | 9/2008 | Marks et al. .................. 257/40 |
| 2009/0247080 A1 * | 10/2009 | Falck ............................ 455/41.2 |

FOREIGN PATENT DOCUMENTS

| | | |
|---|---|---|
| DE | 10 2006 054 835 | 5/2008 |
| EP | 0 295 985 | 12/1988 |
| JP | 2003-70063 | 3/2003 |
| JP | 2005-519557 | 6/2005 |
| WO | WO 03/075227 | 9/2003 |
| WO | WO 03/077361 A1 | 9/2003 |

OTHER PUBLICATIONS

James Bond Gadget Watch History—Q-Branch Issues, The Watchismo Times, 1995, http://watchismo.blogspot.com/2006/11/james-bond-gadget-watch-history-q.html.*

International Search Report of PCT/AT2009/000386, Feb. 17, 2010.

English translation of Japanese Office Action in Japanese Patent Application No. 2011-530324, mailed Dec. 10, 2013.

PC Card—Wikipedia the free encyclopedia, http:/en.wikipedia.org/wiki/PC-Card, retrieved Jul. 16, 2014 (7 pages).

* cited by examiner

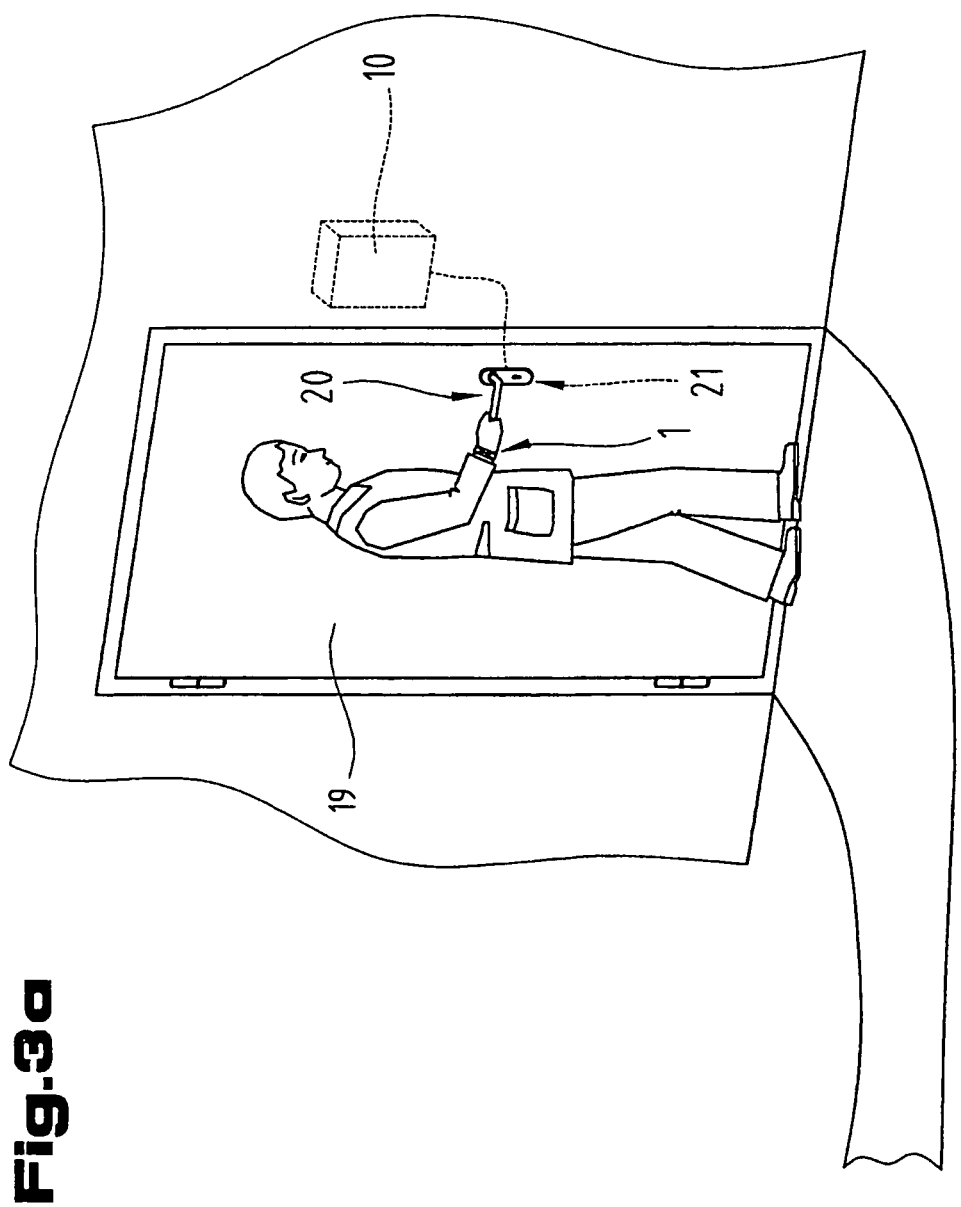

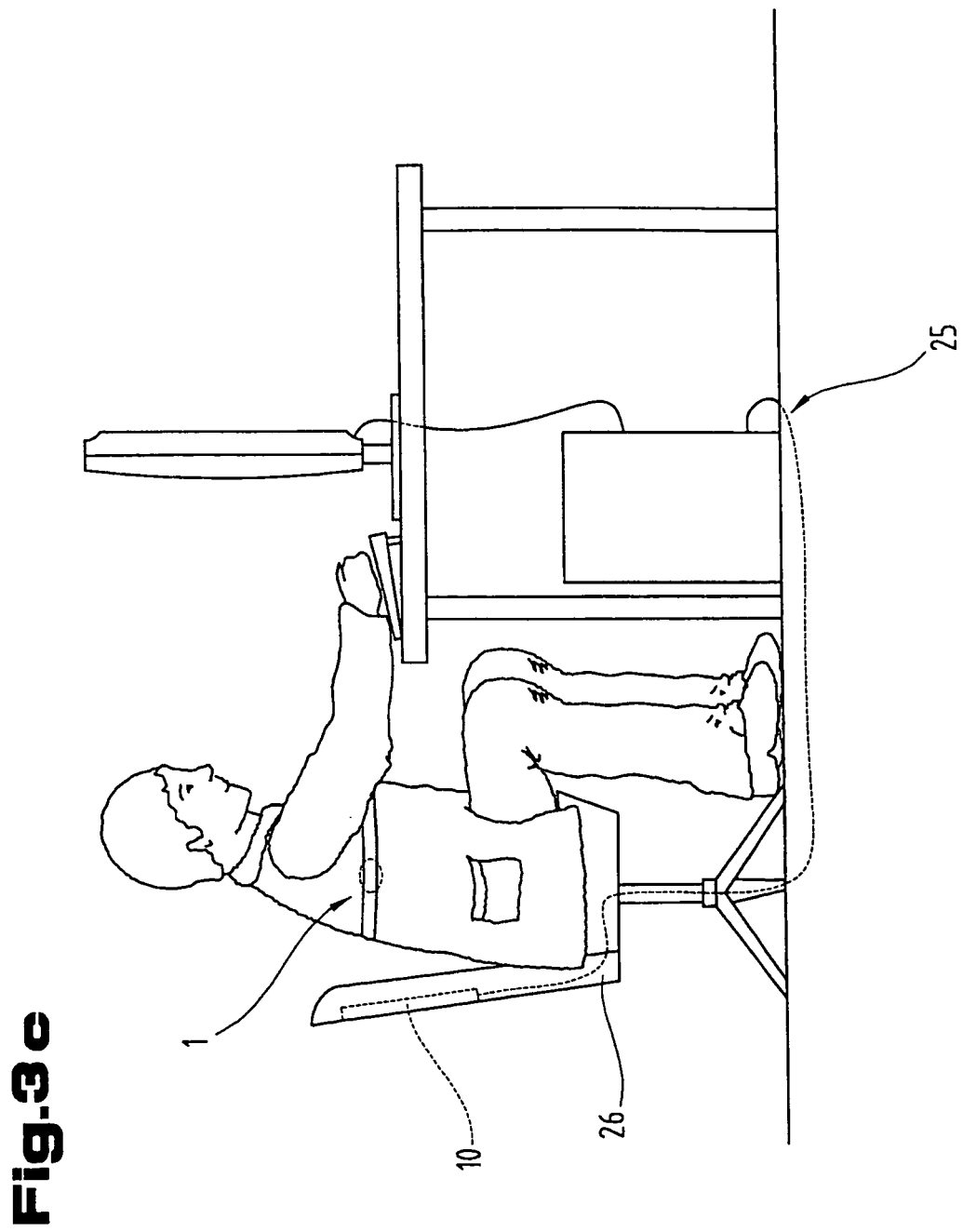

MOBILE DATA MEMORY WITH AUTOMATIC DELETE FUNCTION

CROSS REFERENCE TO RELATED APPLICATIONS

This application is the National Stage of PCT/AT2009/000386 filed on Oct. 7, 2009 which claims priority under 35 U.S.C. §119 of Austrian Application No. A 1568/2008 filed on Oct. 7, 2008, the disclosure of which is incorporated by reference. The international application under PCT article 21(2) was not published in English.

The invention relates to a portable data memory comprising a data memory module and a holding or carrying device, which data memory module has a non-volatile, re-writeable semiconductor memory and an access controller with a communication module, and the communication module is also connected to a communication interface.

A whole range of portable data memories is known from the prior art and are usually non-volatile semiconductor memories designed to be easy to carry due to a compact arrangement in a housing. For example, so-called USB sticks are known, where a non-volatile semiconductor memory is disposed in a housing and can be connected to a data processing unit via a serial communication interface. Data memories of this type are usually carried by a person, for example in a receiving means of an item of clothing. However, carrying them in this way poses a risk of the data memory being inadvertently lost or stolen from the owner with malicious intent. In this situation, a third party is able to access the stored data unhindered and use it for fraudulent purposes.

Accordingly, portable data memories have been developed which can be worn on the body in such a way that it is not possible for them to be unintentionally mislaid or removed with malicious intent because this would be noticed by the person wearing the portable data memory.

For example, document DE 198 24 643 A1 discloses a personal data ring which is designed as a ring with several independent data memory spaces. This ring operates on the basis of transponder technology and can therefore be used for writing and reading without contacts. The data transmission for writing and reading therefore takes place on the principle of coupled magnetic circuits, in other words a coil of the data ring is introduced into the magnetic field of a reading device. Based on the induction principle known to the person skilled in the art, electrical energy is transmitted to the ring-shaped data memory and, by activating or varying the magnetic field accordingly, an appropriate transmission is sent back to the reading device and can be evaluated as a data transmission due to the transponder principle.

An RFID tag for identifying a user is also disclosed by document US 2004/0256452 A1. The RFID tag is worn as a wristband and is thus assigned to a user. In order to identify the user, the latter places his hand in a device and the RFID tag is read by a reading device. The device also has a fingerprint scanner and a device for detecting a finger or wrist pulse. The detection device is preferably provided in the form of a wrist attachment with a gripping piece so that the user's hand and hence the RFID tag is positioned in front of the co-operating reading device and the user's fingerprint and pulse are simultaneously detected by holding the gripping piece.

Specification U.S. Pat. No. 5,764,888 A discloses an electronic micro-identification circuit which is of a particularly compact design so that it can be disposed inside a coin and is therefore suitable for securing a data transfer or for securing financial transactions. The electronic module is secured in such a way that it cannot be used or employed except by the respectively assigned user. The circuit is designed to store a unique identification feature of a user and to delete it in the event of unauthorized access. In order to authenticate the user, the data module can be connected to a reading device via a hard-wired connection so that an encrypted data set can be compared with the stored data set.

These prior art documents disclose portable data memories which are disposed on a user and uniquely assigned to a user and are also designed to store information and enable it to be read by means of a reading device. The information is usually stored in a non-volatile memory and in particular remains valid until it is deleted or edited from the external reading device. The prior art also discloses systems whereby the assignment of the portable data memory to a person is checked prior to permitting access to the memory unit and stored information. The disadvantage of the known devices in particular is that the information continues to be available in the memory units until the assignment to the user is checked again in readiness for a subsequent access step. In particular, there is a risk that the portable data memory can be read with fraudulent intent, for example by switching off or bypassing prevailing security mechanisms to enable the memory means to be read directly. In particular, it is therefore possible to transfer the data memory of one person to that of another person and thus outsmart the detection device and fraudulently gain access to the stored data.

The objective of the invention is to propose a portable data memory which is of a compact design so that it can be carried by a person without restricting his freedom of movement. It is specifically an objective of the invention to design the portable data memory so that a loss of the assignment of the portable data memory to a person is recognized and on that basis, security actions can be taken with regard to the stored information.

The objective is achieved by the invention due to the fact that the holding or carrying device has a contact detection unit which is evaluated by an assignment monitoring module of the data memory module, and the assignment monitoring module is also connected to the semiconductor memory and/or to the access controller.

The holding or carrying device is preferably designed so that it can be disposed on the user and ensures an assignment in such a way that the user's freedom of movement is not restricted. In particular, it also ensures that the holding or carrying device cannot sustain any damage or be accidentally ripped off during the standard operating actions performed by the user. The contact detection unit is also designed so that it reliably detects contact with the person and in particular so that it cannot cause any unintentional cancellation of the assignment due to the standard operating actions performed by the user.

The assignment monitoring module is able to check periodically that the carrying or holding device is disposed on the user and the checking interval is selected so that removal by a person or fitting by a person is reliably detected. With a view to obtaining a compact design and a long service life, it is of particular importance that the assignment monitoring module, but in particular the data memory module, should not consume any power or, if it does, very little in the idle mode because the portable data memory proposed by the invention may have only a very small amount of space for fitting an electrical power storage.

Based on one embodiment proposed by the invention, the assignment monitoring module is connected to the semiconductor memory and is therefore directly configured so that if it detects that an assignment of the data memory to a user is lost, it is able to access the semiconductor memory directly in order to delete data and influence the semiconductor memory so that the stored information is rendered unusable or inaccessible.

However, it is also possible for the assignment monitoring module to be connected to the access controller, which is in turn connected to the semiconductor memory so that this connection can also be used to initiate or run a routine to render the information in the semiconductor memory unusable.

However, the essential aspect is that the assignment monitoring module, automatically and in particular independently of an external detection and access unit, is able to prevent the information in the semiconductor memory from being accessed again on detecting that an assignment has been lost and can make the information unusable so that it cannot be restored again.

In another embodiment, the data memory module can be disposed on the holding or carrying device or is integrated in it. As a result, it is possible to make the portable data memory proposed by the invention to particularly compact dimensions.

As regards the portable data memory proposed by the invention, it is particularly practical if it is not visible as such when disposed on a person so that its essential function remains largely concealed to a would-be attacker. For example, the data memory may be used as an access control unit, in which case it is important that it is not evident to a third party what device gives a user access or entrance to a facility. Accordingly, an embodiment of particular advantage is one whereby the holding or carrying device is designed as an object of daily use, in particular as an item of jewelry. Items of jewelry would include rings, bracelets and watches for example, which are things normally worn by a person and thus are not immediately conspicuous. Another advantage of items of jewelry is that they are usually in very good contact with the person and the risk of the assignment to the person being lost during a person's normal control actions and movements, which would render the information in the portable data memory unusable as proposed by the invention, is low. In the broadest sense, items of jewelry include all objects of daily use which can be worn on the body in such a way that they will not seem unusual to a third party and which ensure a reliable contact with the person.

For example, the advantage of an embodiment based on a ring is that it is preferably also worn during the night hours, thereby ensuring that the assignment to the person is preserved.

Based on another embodiment, the holding or carrying device may also be provided in the form of a cuff-type device. A device of this type comprises a fastening strap enabling it to be attached to the body in an arrangement whereby the diameter can be varied. One possible embodiment is a chest strap, for example, although an arrangement which is attached to the upper arm or ankle would also be possible. This design enables it to be attached to a person in a manner that is largely invisible to third parties.

In another claimed embodiment, the assignment of the portable data memory to a person can be detected due to the fact that the contact detection unit has a switch contact for example.

This switch contact is preferably operated on the basis of the contact with a body part. Since the holding or carrying device preferably lies against a body part and this body part expends a pressure on the holding or carrying device with a specific mechanical force, the effect of this force can be used as a means of operating a switch contact. For example, one possible embodiment might be a spring contact, the advantage of which is that, having been operated for a first time with a higher force value, only a very slight force is then needed to hold the contact in the operating position. When the holding or carrying device is fitted on the body part, the contact is operated as a result and remains so, in particular until it is subsequently taken off.

However, the claimed, improved contact detection unit may also be designed so that a contact is established when the portable data memory is taken off. In an embodiment based on the design of a ring, it has to be moved over the knuckle when being removed and the change in the diameter of the finger may be used to operate a switch contact.

Another possible design for detecting the assignment of the portable data memory to a person is one where the contact detection unit has a dielectric measuring device which is configured to detect dielectric displacement currents. Accordingly, an electric field is applied to the body surface and the material properties of the body tissue, in particular the skin, cause a dielectric displacement current which affects the electric field applied. These very weak dielectric displacement currents are perfectly safe for persons and offer a reliable way of detecting the assignment, especially as they reliably detect even small changes.

Another possible way of detecting the assignment of the portable data memory to a person is claimed whereby the contact detection unit has an optical transmitter or reflector unit. Such a unit is designed so that a light beam emitted from an optical radiation source is deflected onto the person's skin and the reflected radiation or radiation weakened by the tissue is detected by a quantum detector. By selecting the frequency range of the electromagnetic radiation, the electromagnetic radiation will penetrate tissue to different depths. The particular advantage of this design is that a direct contact with the skin surface is not necessary and detection is also possible from a short distance without essentially restricting the security of the assignment.

In the case of another embodiment, the contact detection unit could incorporate another optical detection means and the claimed measuring device may be configured so that it is able to detect simple biometric features. For example, checking the assignment might also require vital characteristics of the person to be checked. For example, it would be possible to measure a person's pulse by means of an optical measuring device.

One particularly advantageous embodiment is characterized by the fact that the contact detection unit is provided in the form of a piezoelectric contact transmitter. Such a contact transmitter is able to emit an electric voltage pulse when operated, especially when acted on by force. This being the case, the holding or carrying device may be designed so that the effect of exactly such a force is transmitted to the contact transmitter when it is removed from the person's body and the resultant voltage pulse can be used as a means of deleting the information in the semiconductor memory. By opting for an appropriate design of the contact transmitter, the voltage pulse may be such that enough electrical energy is available to delete the semiconductor memory directly or, in the case of another embodiment, to supply the access controller with enough electrical energy for it to delete the semiconductor memory, and the expended energy may optionally be briefly temporarily stored in a capacitive energy storage.

Another particularly advantageous embodiment is obtained if the semiconductor memory has a unit configured to delete the contents of the memory automatically. Known semiconductor memories are usually designed in such a way that they need electrical energy to operate, in other words read and write information. Specifically, it is known that when accessing, it is necessary to address the individual memory units accordingly. This being the case, it is of particular practical advantage if the semiconductor memory is set up on the basis of internal design features so that a routine can be run to delete the entire contents of the memory without addressing the memory directly. For example, a hard-wired access circuit may be provided in the semiconductor memory, which triggers an internal chain reaction due to a voltage pulse at a designated control terminal which irretrievably deletes the entire memory contents.

In addition to deleting the entire memory contents, however, it would also be possible for a contents directory and/or an assignment table in the memory to be deleted. Alternatively, an access circuit could be switched, thereby prevent access to the memory on the basis of hardware.

In the case of another embodiment, the semiconductor memory is provided in the form of an electrically deletable read/write memory, the advantage of which is that applying an electrical voltage to a designated terminal of the semiconductor memory will lead to the memory contents being entirely deleted.

To enable the assignment of the portable data memory to a person to be detected continuously, it may be necessary to provide a small amount of electrical energy under certain circumstances. Accordingly, it is of particular advantage if the assignment monitoring module has a storage for electrical energy. This storage is preferably designed to store a sufficient quantity of electrical energy to supply the assignment monitoring module with electrical energy for the anticipated operating time, thereby ensuring that the assignment of the portable data memory to a person is monitored. Since the information stored in the portable data memory is usually important for a limited period only, for example for one day, only a very small amount of energy is needed to cover this operating period. Given that the quantity of electrical energy which needs to be stored is directly proportional to the requisite volume and the portable data memory proposed by the invention is most preferably very compact, this design offers an advantage in that only the assignment monitoring module needs to be supplied with electrical energy whereas the energy-intensive access controller remains without a supply. For example, it may be that the assignment monitoring module supplies the access controller with electrical energy briefly and, in another embodiment, the semiconductor, but only when necessary to enable the memory contents to be deleted.

Suitable energy storage means would be capacitive storages for example, because they can be made with a small volume and usually have only a very low self-discharge. Since accessing the stored information units usually requires only a very short period of time, this design offers an additional advantage because an energy storage of this type can be recharged in a very short time, especially in the time taken to access the stored information.

Since it is of crucial importance for the portable data memory proposed by the invention that the memory contents can be reliably deleted without being confined to specific memory access processes and methods for this purpose, an embodiment is of advantage in which the assignment monitoring module is designed to emit a voltage pulse. The semiconductor memory and the access controller can be briefly supplied with enough electrical energy to delete the memory contents entirely by means of this voltage pulse. With a view to obtaining another embodiment with an additional security feature, the voltage pulse could also be used as a means of rendering the semiconductor memory unusable, in which case the memory units are destroyed by the voltage pulse for example. A memory of the type which can only be written to once may be used for the semiconductor memory, for example, to which information is written from the issuing point and which is given to a person and thus assigned. The information on such a data memory is therefore valid without restriction and therefore permits the user access or entrance to secured facilities or information. When the person removes the data memory, it is rendered unusable and can therefore not be used again under any circumstances.

There is one embodiment of the portable data memory, specifically designed so as not to restrict the user's freedom of movement, whereby the communication interface ensures that a wireless communication link can be established with a communication center. The wireless communication link may be run on a local area communication system so that if the user with the portable data memory stays in the local vicinity of the communication center, a communication link is established automatically and in particular without any input on the part of the user. Of particular importance is the fact that any third parties present in the area will not be aware of this process taking place, which offers particularly good security protection for the person and the information stored on the portable data memory.

Another particularly advantageous embodiment is obtained if the wireless communication link is obtained by the surface of a person's skin. Since the portable data memory proposed by the invention is preferably worn on a body part and is therefore usually in direct contact with the person's skin, it is of particular advantage if the skin is used as a communication link because this obviates the need for additional devices and additional communication means in order to access the stored information. Another advantage of using the skin as a communication means is that the communication link can be established by contact with an object. Also of advantage is the fact that no radiation is involved, as a result of which it is basically not possible for third parties to intercept this communication link. For example, the communication center may be disposed in a chair, in which case the person establishes the communication link by sitting down in the chair.

Based on another embodiment, the communication link may be provided on the basis of a high-frequency radio link, for example using known communication technology such as BlueTooth or ZigBee, and the person skilled in the art will be familiar with other wireless high-frequency communication links. In particular, by selecting the frequency range and the radiation power, the range of the communication link can be set in a defined manner, thereby ensuring that a communication link can be established within only a limited local range.

Another particularly advantageous embodiment is obtained if the communication interface is designed to transmit data and electrical energy. In order to operate the portable data memory as intended, it is usually necessary to supply electrical energy and it is preferable if the energy requirement is kept low. Based on some advantageous embodiments in particular, a storage for electrical energy is provided and has to be recharged to enable a supply of sufficient electrical energy to run the portable data memory during the time of autarchic operation. In this respect, the claimed embodiment offers the specific advantage of enabling both a data exchange with a communication center to be run via a communication interface and also a transmission of electrical energy to supply the portable data memory at the same time.

Based on another embodiment, the data memory module has a storage for electrical energy, the particular advantage of which is that components of the portable data memory, for example the access controller and assignment monitoring module, can be supplied with electrical energy without the need for a connection to an external device and in particular without the portable data memory having to be positioned in the vicinity of such a device. This energy storage may be provided in the form of a galvanic element, for example, given the preference for low energy consumption by the portable data memory, although another embodiment is possible whereby this energy storage is provided in the form of a capacitive element. Based on some advantageous embodiments, it may be necessary for only the assignment monitoring module to be supplied with electrical energy to enable a loss of the assignment of the portable data memory to a person to be detected immediately and reliably and then delete the information in the semiconductor memory. Furthermore, the information on the portable data memory is stored for only a limited period, for example for several hours or for a few days. This means that the energy which has to be supplied can be kept low, which has a direct impact on the volume needed for the electrical energy storage and means that it can be integrated in the data memory module particularly easily.

Another particularly advantageous embodiment is obtained if the components of the data memory module are predominantly provided in the form of organic semiconductor components. Organic semiconductor components can be manufactured particularly inexpensively and easily and also do not pose any problems in terms of environmentally friendly disposal at the end of the usage period. Organic semiconductors also make for particularly rational production methods and do not require complex or energy-intensive production steps. Components comprising organic semiconductor components offer the advantage of being much more resistant to mechanical deformation and can be disposed on the holding or carrying device without the risk of damage.

Another embodiment offers an additional security feature whereby a person-related reference feature is stored in the data memory module. Such a feature might be a unique electronic key or a biometric reference feature for example, and other features which can be stored in a data memory would also be feasible. As a result, the portable data memory may also be used as a personal identification means because having been authenticated by an appropriate authority, the data memory can be assigned to a person and this assignment will be preserved until the data memory is removed. During an access or entrance authorization, the communication center will be able to detect a current reference feature and compare it with the stored feature, thereby checking the identity and authenticity of the person.

In the case of safety-critical applications, it may be of interest to know to which persons the portable data memory was previously assigned. This being the case, a series of person-related reference features may be stored in the data memory module in another embodiment. In the case of one possible embodiment of the portable data memory, it may be given by an assigned person to another person who is not able to access the stored information until he has been authorized accordingly. With every authorization, a person-related reference feature is stored in a sequence memory to enable tracking, for example in the sense of a reading confirmation. It is preferable if it is not possible to write to this sequence memory from outside, in other words from the communication center, and in particular it is also not changed when the assignment is lost.

The objective of the invention is also achieved on the basis of a method of storing person-related information on a portable data memory, whereby a loss of the assignment of the portable data memory to a person is detected. Due to the information pertaining to the loss of the personal assignment, steps can be initiated to secure the information stored in the data memory.

Another embodiment whereby the information stored on the data memory is automatically deleted if the assignment is lost offers a particular advantage in that the stored information is reliably rendered unusable immediately the portable data memory can no longer be assigned to a person without the process of rendering it unusable having to be initiated or triggered by an external center. Consequently, it is specifically not possible to remove the data memory from a person and gain direct access to read the information stored on the memory module.

Based on another embodiment, if the assignment is lost, a person has to be authenticated before being able to access the information. The advantage of this embodiment is that the stored information is not rendered unusable immediately but the person has to authorize himself again in order to be able to access the information. The data memory can also be given to another person, who will gain access to the information once he has successfully completed the authorization procedure. If this authentication fails, already written security measures can be initiated in order to render the stored information unusable.

In addition to rendering the stored information unusable, it may be of advantage if access to the stored information is prevented when an assignment is lost. Consequently, the information is still stored in the data memory but is no longer directly accessible. Based on other embodiments, a new authorization will then be necessary in order to be able to access the information again.

To provide a clearer understanding, the invention will be explained in more detail below with reference to the appended drawings.

Figure 2:
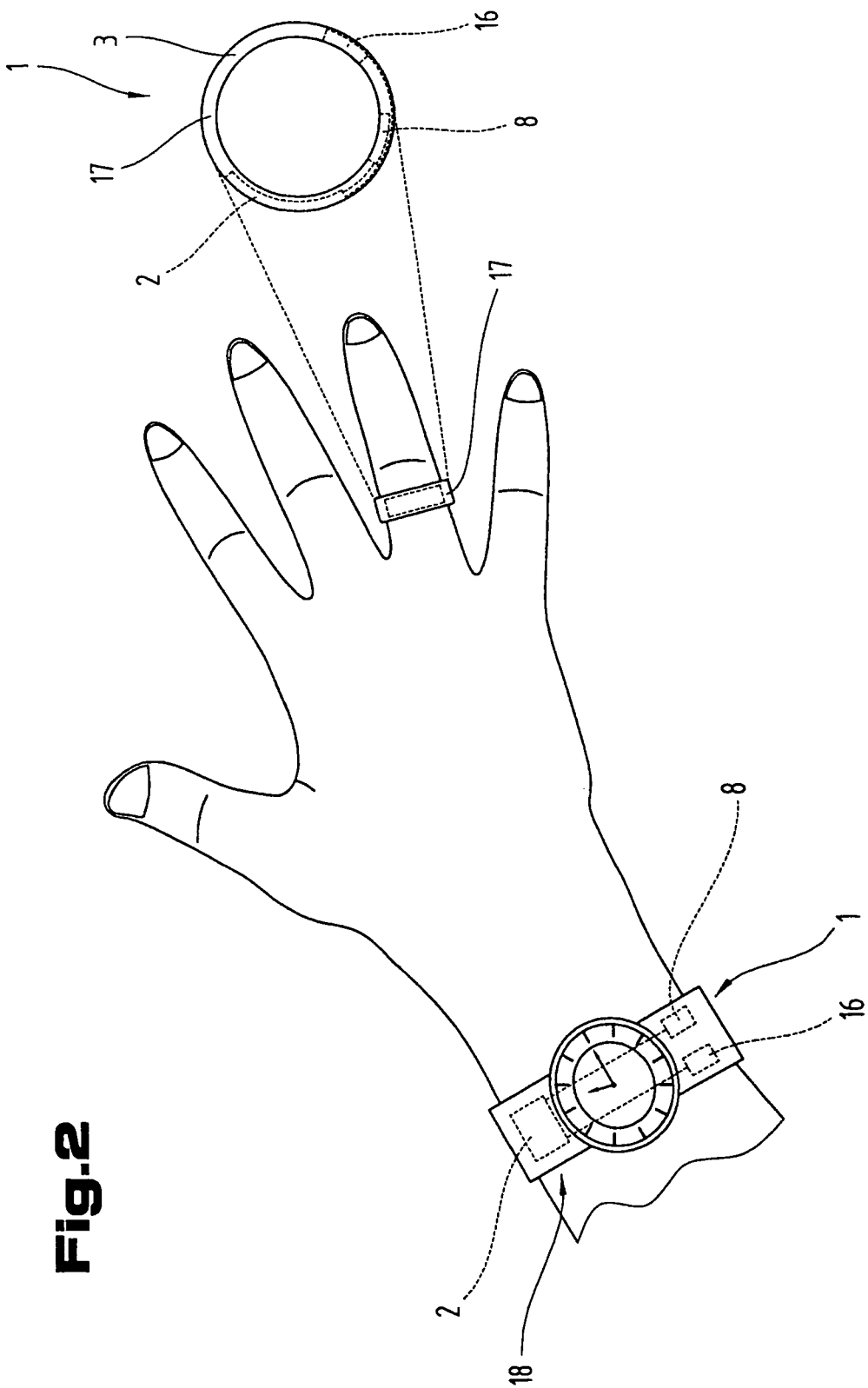

These are highly schematically simplified diagrams showing:

FIG. 1 the portable data memory proposed by the invention;

FIG. 2 possible embodiments of the portable data memory proposed by the invention;

FIG. 3 various possible ways in which the portable data memory proposed by the invention may be read.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described. Individual features or combinations of features from the different embodiments illustrated and described may be construed as independent inventive solutions or solutions proposed by the invention in their own right.

All the figures relating to ranges of values in the description should be construed as meaning that they include any and all part-ranges, in which case, for example, the range of 1 to 10 should be understood as including all part-ranges starting from the lower limit of 1 to the upper limit of 10, i.e. all part-ranges starting with a lower limit of 1 or more and ending with an upper limit of 10 or less, e.g. 1 to 1.7, or 3.2 to 8.1 or 5.5 to 10.

FIG. 1 illustrates the portable data memory 1 proposed by the invention, comprising a data memory module 2 as well as a holding or carrying device 3. The data memory module 2 has a non-volatile, re-writeable semiconductor memory 4 and is connected to the access controller 5 and optionally to the assignment monitoring module 6. The access controller 5 also has a communication module 7 connected to a communication interface 8, which establishes a preferably wireless communication link 9 with a communication center 10. The data memory module 2 may optionally also have a storage 11 for electrical energy, which is preferably connected to the communication interface 8. Via the communication link 9, which is preferably a two-way system and particularly preferably designed to transmit data and electrical energy, the electrical energy storage 11 supplies electrical energy by splitting the data and energy transmission. In particular, the communication interface 8 or the communication module 7 is designed to direct the electrical energy transmitted via the communication link 9 in a regulated manner to the electrical energy storage 11 and thus charge it in a defined manner.

Based on one embodiment, the assignment monitoring module 6 may also have a storage 12 for electrical energy. The particular advantage of this embodiment is that the assignment monitoring module 6 is able to monitor continuously to ascertain that the holding or carrying device 3 is assigned to a person and if this assignment is lost can automatically delete the memory contents in the semiconductor memory 4 without it being necessary to run the access controller 5 for this purpose. In particular, it is therefore also possible to delete the memory contents without having to set up a communication link 9 to a communication center 10. This represents a particularly practical advantage over systems known from the prior art because it means that the memory contents are rendered unusable immediately the assignment is lost and are not left intact until another connection is made to a communication center, which would make it possible to access the memory contents and read the semiconductor memory directly for fraudulent purposes.

By particular preference, all the components of the portable data memory are designed to require especially low energy consumption. In particular, the access controller may be provided in the form of a low-power microcontroller, for example.

The memory contents can be deleted in several ways. If using a semiconductor memory 4 in a manner known in connection with portable data memories, the stored data units can be deleted in one operation by deleting the contents directory 13 of the memory, as a result of which the link to the data units 14 is lost. However, clever attackers would nevertheless be able to read the data units 14 and thus restore the information that was actually deleted. Consequently, another possible way of deleting the memory is to overwrite both the contents directory 13 and the data units with invalid data. These two processes are preferably run by the access controller 5 which accesses the memory 4 and addresses the individual data units and optionally overwrites them with invalid data for this purpose. This procedure requires a certain amount of time as well as electrical energy to enable the access controller 5 and the semiconductor memory 4 to operate. In one especially advantageous embodiment, the semiconductor memory 4 has a so-called delete device 15 which is physically integrated in the memory so that this device has direct and immediate access to all the data units and can delete them in one hit without individually addressing the memory units. A memory element of a semiconductor memory is provided in the form of a small charge storage, in particular a so-called field-effect transistor, which may have an additional terminal disposed in the charging zone for example, by means of which the charge and hence the stored information can be rapidly depleted. This delete device 15 may be designed so that a voltage pulse applied to an appropriate cooperating terminal will trigger the deletion process which automatically runs through the memory units without any further input and thus deletes the semiconductor memory 4. For example, the assignment monitoring module may use electrical energy from the energy storage 12 to generate this voltage pulse. However, the essential aspect of the portable data memory proposed by the invention is the fact that if the assignment of the data memory to user is lost, the stored information is automatically rendered unusable, whether it is fully or partially deleted or overwritten with invalid data.

Since the portable data memory is preferably designed so that the actual function remains concealed from a third party, the holding or carrying device 3 is preferably designed so that it appears to be a normal personal object for daily use. A preferred embodiment is one based on a ring or bangle, bracelet or wristwatch, because such objects, in particular items of jewelry, are commonly worn by a person and will therefore not be conspicuous and will also usually be in close contact with the body surface. In particular, however, such objects require actions in order to remove the object from the body. In the case of a cuff-type carrying device carrying device or a bracelet, for example, a catch has to be opened in order to take the bracelet off. A ring has to be pulled over the narrow point by a finger, for example. Since the holding or carrying device 3 may have a contact detection unit 16, this designated action may be used as a means of activating the contact detection unit. Based on the described embodiments, the contact detection unit 16 may be provided in the form of a switch contact, in particular a spring contact, although it would also be possible to opt for an embodiment such as a piezoelectric contact transmitter, for example. These embodiments convert an active force into an electrical output signal causing a current circuit to be closed or opened or a voltage pulse to be emitted. Other embodiments of the contact detection unit 16 enable a more specific detection of the tissue, in particular the skin. For a detailed description of the advantages of the individual embodiments, reference may be made to the description given above.

However, the contact detection unit is designed in particular to ensure that the assignment of the holding or carrying device 3 to a person is reliably detected without restricting the wearer's freedom of movement.

One particularly advantageous embodiment is obtained if the person's skin is used as the communication link 9. Since the data memory proposed by the invention is preferably in direct contact with the skin surface, this embodiment offers a particular advantage in that the entire person functions as a transmitter and receiver system of the portable data memory. In particular, this means that it is possible to establish a data contact between the communication center 10 and the portable data memory 1 without third parties being aware of it. Possible embodiments which may be used for this approach will be described in more detail below with reference to the drawings.

The data memory module 2 is preferably disposed on the holding or carrying device 2 or is integrated in it so that the actual function of the holding or carrying device remains essentially unchanged and in particular, the holding or carrying device 3 is not conspicuous as a portable data memory.

FIG. 2 illustrates two possible embodiments of the portable data memory 1 proposed by the invention. For example, the holding or carrying device 3 may be provided in the form of a ring 17 and the data memory module 2 as well as the communication interface 8 and contact detection unit 16 are disposed in the material of the ring. In the preferred embodiment where the person's skin serves as the communication link, the communication interface 8 is disposed so that it ensures a reliable contact with the person's finger without surrounding the circumference of the finger too tightly. However, the diameter of the ring must be selected so that when the ring is taken off, in particular as it is moved over a knuckle, enough force is exerted on the contact detection unit 16 to activate a contact transmitter element and emit an appropriate signal. In the case of a contact detection unit which does not operate on a mechanical principle, however, care must be taken to ensure that removal leads to a loss of assignment and in particular cannot be manipulated if the ring is immediately placed on the finger of a second person.

However, it is also possible to design the portable data memory 1 proposed by the invention as a cuff-type device, for example as a bracelet in the form of a wristwatch 18. A third party will primarily see an item of jewelry or timepiece and the data memory module 2 with the communication interface 8 and contact detection unit 16 will remain unnoticed. In this embodiment, the contact detection unit 16 may be provided in the form of the bracelet catch.

Figure 3B:
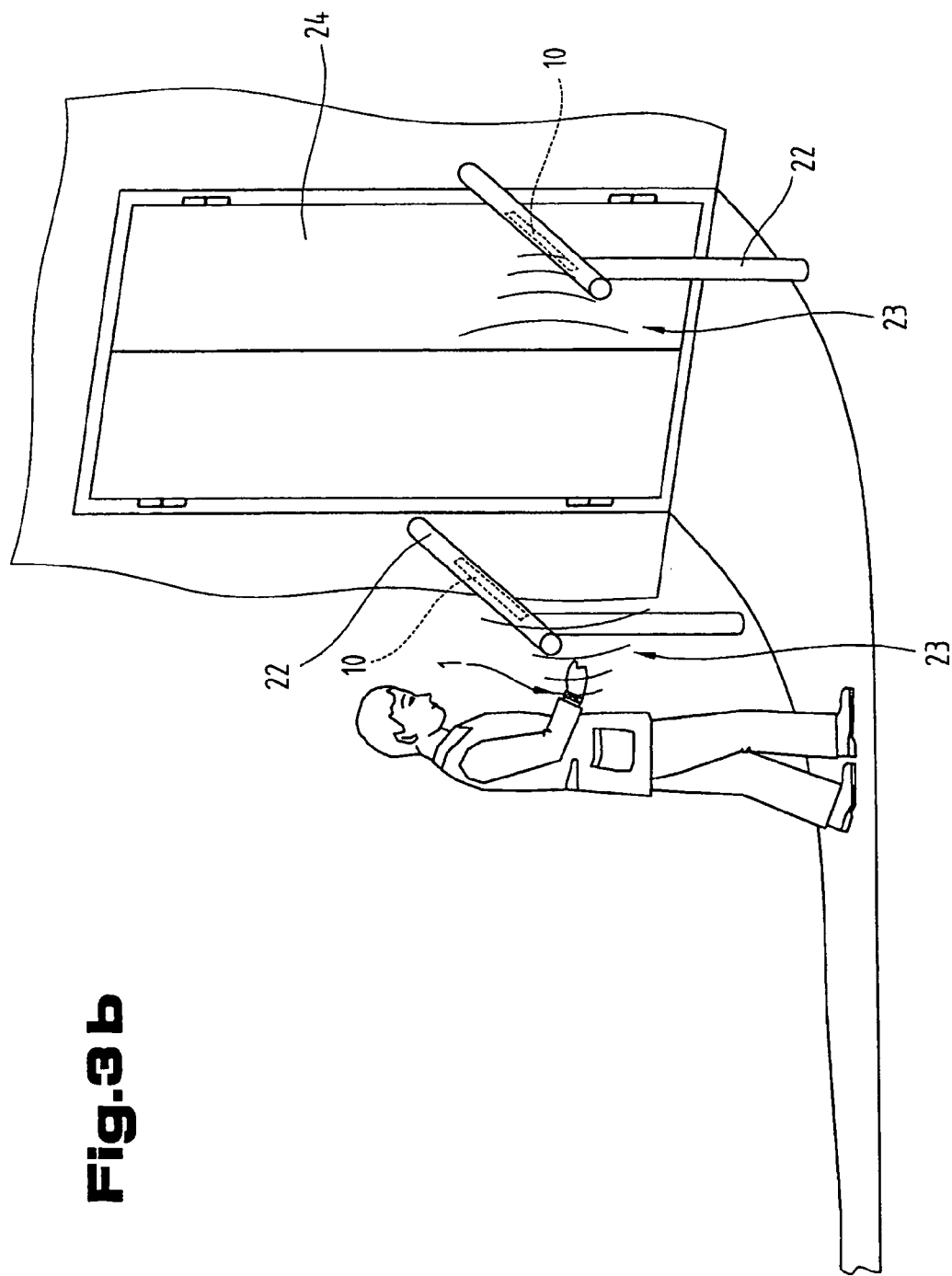

FIGS. 3*a* to 3*c* illustrate different ways in which the portable data memory proposed by the invention can be read, for example in order to secure access to facilities.

FIG. 3*a* illustrates an access control system, for example, in which an access locking unit 19 cannot be unlocked except by an authorized user. The user wears the portable data memory 1 proposed by the invention on the body and the communication link is established when contact is made with a device of the access lock, for example a door handle 20, and the communication center 10 is able to access the portable data memory 1 and read access rules stored in the semiconductor memory for example. Following a comparison with reference features and provided a successful match is found, the lock 21 is released, giving the user access. The features by which a person gains access are not obvious to a casual observer.

FIG. 3*b* illustrates a similar access locking system, and the portable data memory 1 is likewise worn on the body and passes a detection unit 22. A near field, in particular an electromagnetic near field 23, is emitted by the detection unit, in particular by the communication center 10, which is picked up and evaluated by the communication interface of the data memory module. Since electrical energy and preferably data are transmitted by means of the near field 23, enough electrical energy to operate the portable data memory during the detection process is supplied whilst the portable data memory 1 remains within the near field 23. The person is identified and authenticated in the same way as described above and the access locking unit 24 is unlocked and the user given access if the identification is successful.

FIG. 3*c* illustrates another embodiment where the user wears the portable data memory 1, for example in the form of a chest strap. The user may be seated in front of a secured data processing unit 25, for example on a chair 26, and the communication center 10 is integrated in this chair. The communication center 10 reads the stored features from the portable data memory and this user is granted access to the data processing unit 25 following a comparison and successful match.

It is also possible to transmit data units from the data processing unit 25 to the portable data memory 1 via the communication center 10 without the data memory having to be connected to the data processing unit for this purpose.

A further increase in the security of the data stored on the portable data memory can be obtained if, in addition to disposing the portable data memory on a body part, vital characteristics of the wearer are detected by the portable data memory, for example. This being the case, it can be unambiguously established that a living person with a correctly assigned portable data memory was detected by the communication center.

The embodiments illustrated as examples represent possible variants of the portable data memory, and it should be pointed out at this stage that the invention is not specifically limited to the variants specifically illustrated, and instead the individual variants may be used in different combinations with one another and these possible variations lie within the reach of the person skilled in this technical field given the disclosed technical teaching. Accordingly, all conceivable variants which can be obtained by combining individual details of the variants described and illustrated are possible and fall within the scope of the invention.

For the sake of good order, finally, it should be pointed out that, in order to provide a clearer understanding of the structure of portable data memory, it and its constituent parts are illustrated to a certain extent out of scale and/or on an enlarged scale and/or on a reduced scale.

The objective underlying the independent inventive solutions may be found in the description.

Above all, the individual embodiments of the subject matter illustrated in FIGS. 2 and 3 constitute independent solutions proposed by the invention in their own right. The objectives and associated solutions proposed by the invention may be found in the detailed descriptions of these drawings.

List of Reference Numbers

1 Portable data memory
2 Data memory module
3 Holding or carrying device
4 Semiconductor memory
5 Access controller
6 Assignment monitoring module
7 Communication module
8 Communication interface
9 Communication link, wireless communication link
10 Communication center
11 Electrical energy storage
12 Electrical energy storage
13 Contents directory
14 Data units
15 Delete device
16 Contact detection unit
17 Ring
18 Bracelet, wrist strap, wristwatch
19 Door, Access locking unit
20 Handle
21 Lock
22 Detection unit
23 Near field
24 Access locking unit
25 Data processing unit
26 Chair

The invention claimed is:

1. Portable data memory, comprising a data memory module and a holding or carrying device, which data memory module is predominantly made up of organic semiconductor components and has a non-volatile, re-writeable semiconductor memory and an access controller with a communication module, and the communication module is also connected to a communication interface, wherein the communication interface is configured to transmit data and electrical energy over a wireless communication link established with a communication center, the wireless communication link comprising a surface of a person's skin, wherein the holding or carrying device has a contact detection unit configured to detect whether the holding or carrying device has contact with the person's skin; the data memory module also has an assignment monitoring module which is designed to evaluate the contact detection unit which is connected to the memory module and/or to the access controller, and wherein the assignment monitoring module is configured to emit voltage pulse which supplies the semiconductor memory and the access controller with enough electrical energy to entirely delete the memory contents.

2. Portable data memory according to claim 1, wherein the holding or carrying device is an object of daily use, in particular an item of jewelry.

3. Portable data memory according to claim 1, wherein the holding or carrying device is a cuff-type device.

4. Portable data memory according to claim 1, wherein the contact detection unit has a switch contact.

5. Portable data memory according to claim 1, wherein the contact detection unit has a dielectric measuring device.

6. Portable data memory according to claim 1, wherein the contact detection unit has an optical transmitter and/or reflector unit.

7. Portable data memory according to claim 1, wherein the contact detection unit is a piezoelectric signal transmitter.

8. Portable data memory according to claim 1, wherein the semiconductor memory has a device designed to automatically delete the memory contents.

9. Portable data memory according to claim 1, wherein the semiconductor memory is an electrically deletable read/write memory.

10. Portable data memory according to claim 1, wherein the assignment monitoring module has a storage for electrical energy.

11. Portable data memory according to claim 1, wherein the wireless communication link is a high-frequency radio link.

12. Portable data memory according to claim 1, wherein the data memory module has a storage for electrical energy.

13. Portable data memory according to claim 1, wherein a person-related reference feature is stored in the data memory module.

14. Portable data memory according to claim 1, wherein a series of person-related features is stored in the data memory module.

15. Method of storing information relating to persons in a portable data memory comprising a data memory module and a holding or carrying device, which data memory module is predominantly made up of organic semiconductor components and has a non-volatile, re-writeable semiconductor memory and an access controller with a communication module, and the communication module is also connected to a communication interface, wherein the communication interface is configured to transmit data and electrical energy over a wireless communication link established with a communication center, the wireless communication link comprising a surface of a person's skin, and wherein the holding or carrying device has a contact detection unit configured to detect whether the holding or carrying device has contact with the person's skin; the data memory module also has an assignment monitoring module which is designed to evaluate the conduct detection unit which is connected to the memory module and/or to the access controller, wherein the communication center is able to access the information stored on the data memory via a communication interface, comprising the step of detecting a loss of an assignment of the portable data memory to a person.

16. Method according to claim 15, further comprising the step of automatically deleting the information stored in the data memory if the assignment is lost.

17. Method according to claim 15, further comprising the step of authenticating a person before being able to access the information if the assignment is lost.

18. Method according to claim 15, further comprising the step of preventing access to the stored information if the assignment is lost.

* * * * *